Sept. 8, 1964  D. T. COOPER  3,147,645
BORING TOOL
Filed Nov. 6, 1961
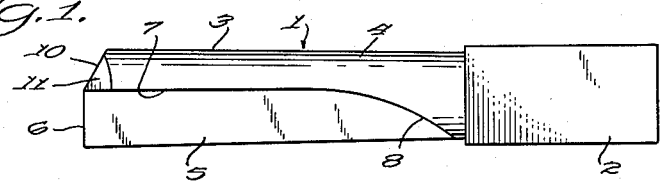
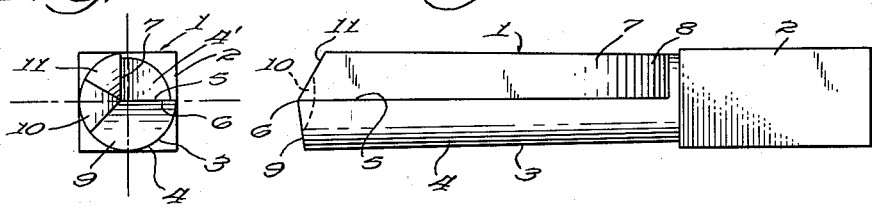
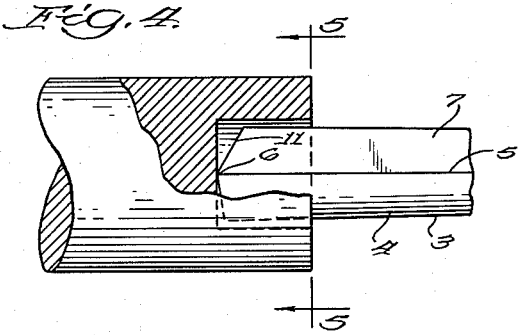
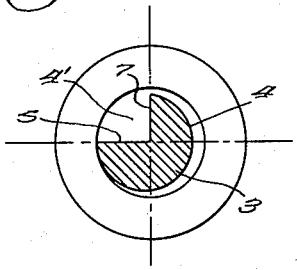
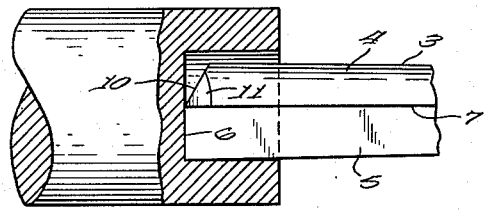
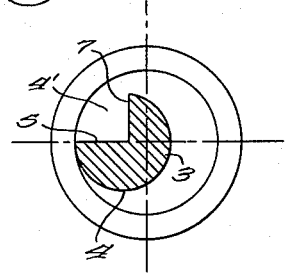
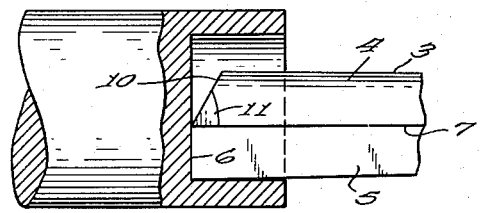
INVENTOR.
Don T. Cooper
BY
Harold J. LeVesconte
Atty.

2,147,645
Patented Sept. 8, 1964

3,147,645
BORING TOOL
Don T. Cooper, 12310 Chandler Blvd.,
North Hollywood, Calif.
Filed Nov. 6, 1961, Ser. No. 150,330
5 Claims. (Cl. 77—58)

This invention relates to boring tools and more particularly to an improved form thereof characterized by simple design, rigidity, and capability of being employed to form holes of varying sizes.

An object of the invention is to provide a boring tool capable of being used, for example, on the cross-slide tool post of a lathe or in any tool holder means which is adjustable in a line extending radially of the axis of the hole to be bored.

Another object of the invention is to form a boring tool comprising a single lip cutting edge at the end of an appropraite shaped bar of tool forming material, whereby sharpening of a tool is achieved by grinding the end of the bar with resultant efficient and economical use of the cutting material.

Still another object of the invention is to provide a boring tool in which the foregoing objectives are realized in practice, which is of simple design, is readily installed in the machine tool for which it is intended and which is sufficiently rigid to permit the use thereof in boring holes of great accuracy.

With the foregoing objects in view, together with such additional objects and advantages as may subsequently appear, the invention resides in the provision of a boring tool of the general type described in the following specification of a presently preferred embodiment of the invention, reference being had to the accompanying drawings which form a part of said specification and in which drawings:

FIG. 1 is a top plan view of a boring tool embodying the present invention; the designation "top plan" view having reference to the use of a tool in a non-rotating relation to a rotating workpiece held in a chuck or like on a lathe or similar horizontal spindle machine tool, FIG. 2 is a front side elevational view of the tool shown in FIG. 1, FIG. 3 is an end elevational view as viewed from the left hand end of FIG. 2, FIG. 4 is a fragmentary side elevational view similar to FIG. 2 but showing the tool boring a hole in a workpiece; the workpiece being shown partially in medial section for clarity, FIG. 5 is a transverse sectional view of the tool taken on the line 5—5 of FIG. 4, FIG. 6 is a top plan view of the tool disposed within the hole in the workpiece as shown in FIGS. 4 and 5; the workpiece surrounding the hole being shown in medial section, FIG. 7 is a view similar to FIG. 5 showing the tool adjusted laterally to enlarge the hole initially bored, and FIG. 8 is a top plan view similar to FIG. 6 but showing the tool in the position shown in FIG. 7.

As used in the specification and claims, the term "boring" may mean either the initial formation of a hole or the enlargement of an existing hole.

Referring first to FIGS. 1, 2 and 3, the illustrated embodiment of the invention comprises a tool 1 formed from a single piece of tool steel or equivalent metal cutting material including a shank portion 2 of square configuration and having an elongated tool bit portion 3 projecting from one end thereof. The tool bit portion 3 is of modified circular sectoral shape in cross secetion, said sectoral shape being (as will be later explained) slightly less than three-quarters of a circle in circumferential extent and the circumferential surface of said modified sectoral shape increasing slightly in radial dimension toward the distal end of the tool bit giving the rounded surface 4 of the tool bit a slight frusto-conical configuration.

The portion of the tool bit thus removed to give it the said modified sectoral shape comprises a right angle cut or notch 4' extending lengthwise of the tool bit having a first side 5 disposed in the plane of the axial line of the tool bit and at its distal end forming the cutting edge for the tool bit. The side 5 extends in said plane from its juncture with the rounded side surface of the tool bit to and slightly beyond the axial line of the tool bit and forms a juncture with a right angle side 7 thus giving the cutting edge 6 a length which is greater than the radial dimension of the tool bit.

This right angle notch or cut 4' defined by the sides 5 and 7 can conveniently be formed by a milling cut or by grinding, wherefore, the side or wall 7 will terminate in a curved portion 8 adjacent the shank 1, said curved portion being formed by the peripheral surface of the milling cutter or grinding wheel employed to form this notch.

The distal end of the tool bit is formed in three face portions or facets 9, 10, and 11. These facets each lie in separate planes disposed at increasing acute angles relative to a plane normal to the axial line of the tool bit and containing the cutting edge 6; said plane for identification in describing said facets being referred to as the "end plane." The facet portion 9 lies in a plane disposed at a slight acute angle to said end plane and intersecting said end plane at the line of the cutting edge 6, said plane of said facet extending from the cutting edge toward the shank of the tool bit to form clearance for the cutting edge.

The facet 10 extends in a plane disposed at a similarly and slightly greater acute angle to the said end plane than the angle of the facet 9; the plane of the facet 10 extending normal to the side 5 of the notch 4' and the line of intersection of the plane of said facet and said end plane being parallel to the side 7 and coincident with a line parallel to said side and extending from the corner formed by the juncture of the sides 5 and 7 at the cutting edge 6 of the tool bit.

The facet 11 lies in a similar plane disclosed at a still greater acute angle to the said end plane than the facets 9 or 10; the plane of said facet intersecting the said end plane on a line coincident with the cutting edge 6 and giving the portion of the tool bit extending from the outermost edge of the side 7 of the notch 4' a relatively wide clearance as best seen in FIGS. 6 and 8.

Referring next to FIGS. 4 through 8, the manner of use of the boring tool is shown. FIGS. 4, 5 and 6 show the start of a bore and FIGS. 7 and 8 show the enlargement of the bore. In FIG. 3, it will be noted that as previously described, the cutting edge 6 is of greater length than the radial dimension of the tool bit. The tool is so positioned relative to the work that the corner formed by the notch sides 5 and 7 is coincident with the axis of rotation of the workpiece W where the tool is stationary and the work is rotated. In case the tool is rotated and the work is stationary, said corner is disposed coincident with the axial line of the hole to be bored. The tool is fed into the work with the cutting edge removing the material. The slight longitudinal taper of the tool bit affords the necessary clearance between the side of the tool and the hole. Since the cutting edge is of greater length than the radial dimension of the tool bit, this positioning of the tool relative to the workpiece will leave a wide clearance between the rear face of the tool bit and the hole so that there is no support given the tool bit by the hole at a point diametrically opposite the cutting edge as is the case with the so-called "gun barrel" drills or other single lip drills.

When the initial hole has been formed, in the event that a hole larger than the initial hole is desired, the tool is moved out of the hole, is then moved laterally to the desired extent and again fed into the hole to form a still larger hole as is shown in FIGS. 6 and 8. Normally, where holes of great accuracy are to be bored, the initial hole will be only slightly smaller than the desired finished diameter of the hole and the second cut will be a very light finishing cut so that there will be absolutely no distortion of the cutting tool by the work performed in the second or "finishing" cut.

While the disclosed embodiment is that of a tool suitable for use in the tool post of a lathe, it will be understood that this tool bit can be provided with any suitable shank for use in other tool holding means whether stationary for use with a rotating workpiece or rotating for use with a stationary workpiece without invention in the selection of the type of shank desired.

While in the foregoing specification there has been disclosed a presently preferred embodiment of the invention, the invention is not to be deemed to be limited to the details thus shown by way of example and the invention will be understood to include all such changes and modifications as shall come within the purview of the appended claims.

I claim:
1. A boring tool comprising
    a bar of hard metal including one end constituting
    a shank portion adapted to be secured in a tool holding means of a machine tool and
    an elongated tool bit portion formed integrally with said shank portion and constituting the distal end of said tool;
    said tool bit portion being of modified circular sectoral configuration in cross section and having the circular portion of the surface thereof gradually uniformly increasing in its radial dimension from said shank portion to the distal end of said tool bit portion;
    said sectoral configuration being defined by a notch extending longitudinally of said tool bit portion and defined by intersecting flat faces one face of said notch being of greater width than the radial dimension of said tool bit portion at said distal end thereof.
2. A boring tool as claimed in claim 1
    in which the juncture of said one face of said notch and the distal end of said tool bit portion forms the cutting edge of said tool bit portion and
    in which the face of said distal end is formed at acute angular relation to a plane normal to the axial line of said tool bit portion and containing said cutting edge to provide clearance for said cutting edge.
3. A boring tool as claimed in claim 1
    in which said one face of said notch lies in a plane coincident with the axial line of said tool bit portion.
4. A boring tool as claimed in claim 3
    in which said notch is formed with two faces only disposed at substantially right angles to each other.
5. A boring tool as claimed in claim 1
    in which said notch is formed with two faces only disposed at substantially right angles to each other.

References Cited in the file of this patent
UNITED STATES PATENTS

| 1,479,488 | Zidakovits | Jan. 1, 1924 |

FOREIGN PATENTS

| 657 | Great Britain | Nov. 14, 1896 |
| 256,153 | Great Britain | Aug. 5, 1926 |

OTHER REFERENCES

"American Machinist," Dec. 2, 1920, pp. 1023 to 1026 relied on.